(12) United States Patent
Coxhead et al.

(10) Patent No.: US 6,366,879 B1
(45) Date of Patent: Apr. 2, 2002

(54) CONTROLLING INTERACTIVE VOICE RESPONSE SYSTEM PERFORMANCE

(75) Inventors: Philip Randall Coxhead, Winchester; Nigel Lewis Jones, Eastleigh; Sanjay Nagchowdhury, Greenford; David G Martin, Eastleigh, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/412,684

(22) Filed: Oct. 5, 1999

(30) Foreign Application Priority Data

Oct. 5, 1998 (GB) .............................................. 9821595

(51) Int. Cl.$^7$ ............................................. G10L 15/22
(52) U.S. Cl. ........................ 704/201; 704/270; 379/88; 379/90.01
(58) Field of Search ............................... 704/201, 270; 379/88; 370/352, 356; 707/10

(56) References Cited

U.S. PATENT DOCUMENTS 5,493,608 A   2/1996   O'Sullivan .................... 379/88
5,771,276 A   6/1998   Wolf ............................ 379/88

FOREIGN PATENT DOCUMENTS

EP   0 697 780   2/1996
EP   0 774 853   5/1997

*Primary Examiner*—William Korzuch
*Assistant Examiner*—Susan McFadden
(74) *Attorney, Agent, or Firm*—Jerry W. Herndon

(57) ABSTRACT

A system of controlling performance in an interactive voice response system includes a voice device driver, a voice segment stored in a file in a directory in a standard operating system format; a buffer for storing the voice segment prior to sending to the voice device driver and a plurality of voice channels for output of the voice segment. A sequence of voice blocks is requested to be sent to a buffer, the sequence being one of a plurality of sequences making up a voice segment. The number of voice blocks sent from the file to the buffer is determined. The play period of the sequence and the next underrun time when the sequence will finish playing based on the initiate request time and the play period are calculated. Also calculated is the margin period between the calculated next underrun time and the actual time after a further sequence of voice data blocks is sent to the buffer in response to a device driver request for a further sequence of voice data blocks. A telephony channel is shut down when the margin period exceeds a defined threshold.

15 Claims, 3 Drawing Sheets

CONTROLLING INTERACTIVE VOICE RESPONSE SYSTEM PERFORMANCE

Technical Field of the Invention

This invention relates to performance monitoring of an interactive voice response system and in particular to calculating metrics for the real time responsiveness of interactive voice response systems.

BACKGROUND OF THE INVENTION

Interactive Voice Response (IVR) systems are an important tool in the Customer Relationship Management (CRM) arena. The IVR system plays a critical role in providing information and features to existing, and potential, business customers who use the telephone as an interface to an enterprise. The usability, responsiveness and performance of solutions using IVR applications is paramount, since these customers will experience the IVR as a "front-office" of a business.

The telephone is the most basic of I/O devices, as the only output is the delivery of speech segments played to the caller. A poor performing IVR platform or voice application will be very apparent to the telephone caller, and will cause frustration, with the potential for an unexpected transfer to a human agent, or worse, a lost call and possibly lost business. Measuring the end-user responsiveness of an IVR application in a realistic, high-volume situation is difficult, whether during acceptance testing or afterwards, when in service.

All IVR applications play voice segments, or prompts, to the caller. In fact, a large percentage of time in a typical telephone call to an IVR is taken up with the playing of voice segments. High capacity IVR systems (with many hundreds of telephony ports) or clusters of IVR systems grouped together in a Single System Image complex (where voice data resides on a separate database server) have the potential to become I/O bound because of the higher volume of voice data being played. This could lead to a degradation in responsiveness.

A particular problem in IVR systems is 'underun' where there is a delay between play of consecutive chunks of a voice segment; delays of over 200 msec are quite noticeable to the human ear. Previously, external devices have been used to listen to telephony channels to measure expected tones and underrun delays. These devices look for the absence of sound or the gap between the chunks of voice but cannot measure when underrun is about to occur. When underrun does occur and is detected by the 'listener' it is too late to do anything about it.

This disclosure describes how new IVR metrics can be used to characterise an IVR application, to facilitate performance evaluation, to monitor an IVR system when in production and to use the evaluation to improve the performance.

DISCLOSURE OF THE INVENTION

A method of controlling system performance in an interactive voice response system, said voice response system including a voice device driver, a voice segment stored in a file in a directory in a standard operating system format; a buffer for storing the voice segment prior to sending to the voice device driver, a plurality of voice channels for output of the voice segment, said method comprising the steps of: requesting a sequence of voice blocks be sent to a buffer, said sequence being one of a plurality of sequences making up a voice segment; determining the number of voice blocks sent from the file to the buffer; requesting the device driver to initiate play of the sequence; calculating the play period of the sequence; calculating a next underrun time when the sequence will finish playing based on the initial request time and the play period; calculating the margin period between the calculated next underrun time and the actual time after a further sequence of voice data blocks is sent to the buffer in response to a device driver request for said further sequence of voice data blocks; and shutting down a telephony channel when the margin period exceeds a defined threshold, to attempt a reduction in the application load, and to bring back to within acceptable limits.

The margin between the next underrun time and the time when the device driver requests a further chunk of voice is called the 'Underun Margin Time' or UMT and is an important performance evaluation metric. As one increases the number of channels available on an IVR system there is a degradation in the overall performance of the IVR system because the processor must share it's resources between an increased number of channels. The UMT is shown against the number of channels in FIG. 1A and it can be seen that the UMT decreases as the number of channels increases. While the UMT is positive there is no underrun and the system is operating effectively. When the UMT is zero there is no underrun but the system has no margin. When the UMT is negative underrun is occurring and there are regular delays when the voice segments are played. So that the IVR system is not being overloaded it is best to chose the number of channels so that the UMT is positive and not close to zero.

It is also important to see how the performance of the system varies as a function of the number of channels in use. FIG. 1B illustrates where the function is not be a simple one and consideration should be made of the shape of the graph otherwise there could be a tendency to set the proposed number of operational channels to too high a value. The UMT can be seen to 'plateau' over a range of channels so that underrun could occur with the same regularity when the channel number was on the 'plateau'. For instance, an 'unsafe' number of channels is marked on the figure as is an 'optimum' number of channels.

The time taken to play a single voice block is stored as a constant and the play time of a chunk is calculated by multiplying the number of voice blocks by the time taken to play a single voice block.

Advantageously the method further comprises the steps of calculating the time taken to fetch the sequence of voice blocks. This time taken is called the Play Latency time in the specification and indicates a degradation in performance of the IVR system if the value increases. A suitable way of calculating the time to fetch the sequence comprises: before requesting the voice blocks to be sent to the buffer, storing the current time; and after the voice blocks have been sent to the buffer and before requesting the device driver to play the voice sequence subtracting the new current time from the stored current time. In this way a consistent measurement can be taken free of complication from the other processes of the evaluation. The Play Latency Time (PLT) is another useful evaluation metric, in FIG. 1C it can be seen that PLT increases with the number of channels that are in use. Too many channels and the high PLT would indicate a poorly performing IVR with too much time taken to fetch the voice sequences. The number of channels should be set to below the 'unsafe' number for a lower PLT and better performing IVR.

The buffer is suitably the operating system buffer which allows the measurements to be taken at an operating system level. Alternatively the buffer could be the device driver buffer which allows a further level of performance evaluation but necessitates some device driver interaction not described in this specification.

The number of voice blocks sent to the buffer is included in the voice block header which accompanies the voice block data, this allows fast acquisition of the length of the voice block. The voice block data is sent to the buffer using operating system I/O routines as the voice segment is stored as a file in a directory in a standard operating system format. This allows simple implementation of the embodiment.

The play time of the sequence is calculated by multiplying the number of data blocks sent to the buffer by a constant, the play time of a compressed data block or an uncompressed data block.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION OF THE INVENTION

Figure 1B:
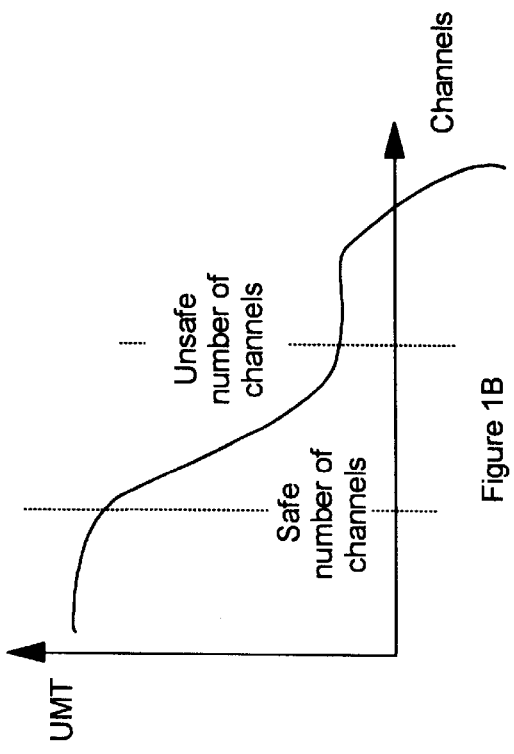
FIGS. 1A, 1B and 1C are graphs representing the performance metrics against IVR channels.
Figure 1A:
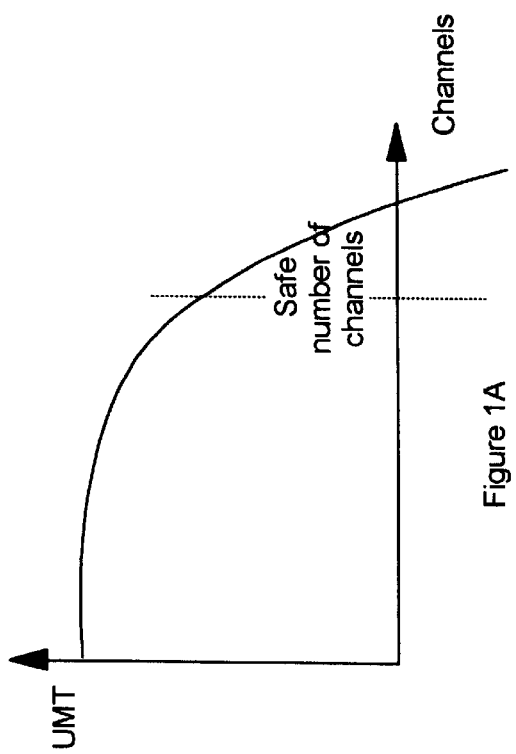
Figure 1C:
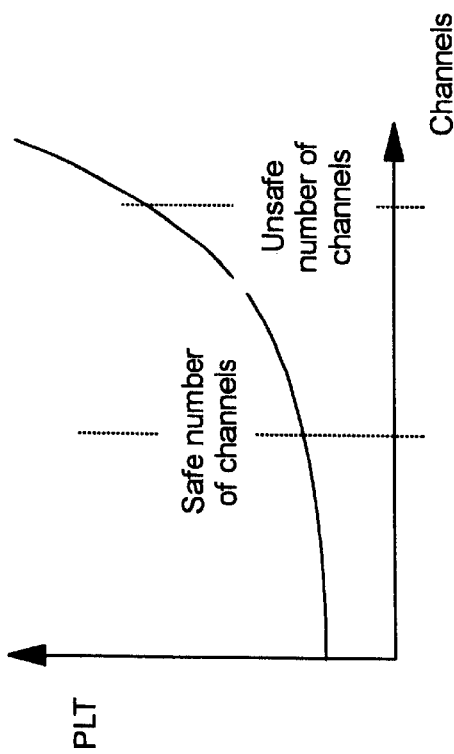
Figure 2:
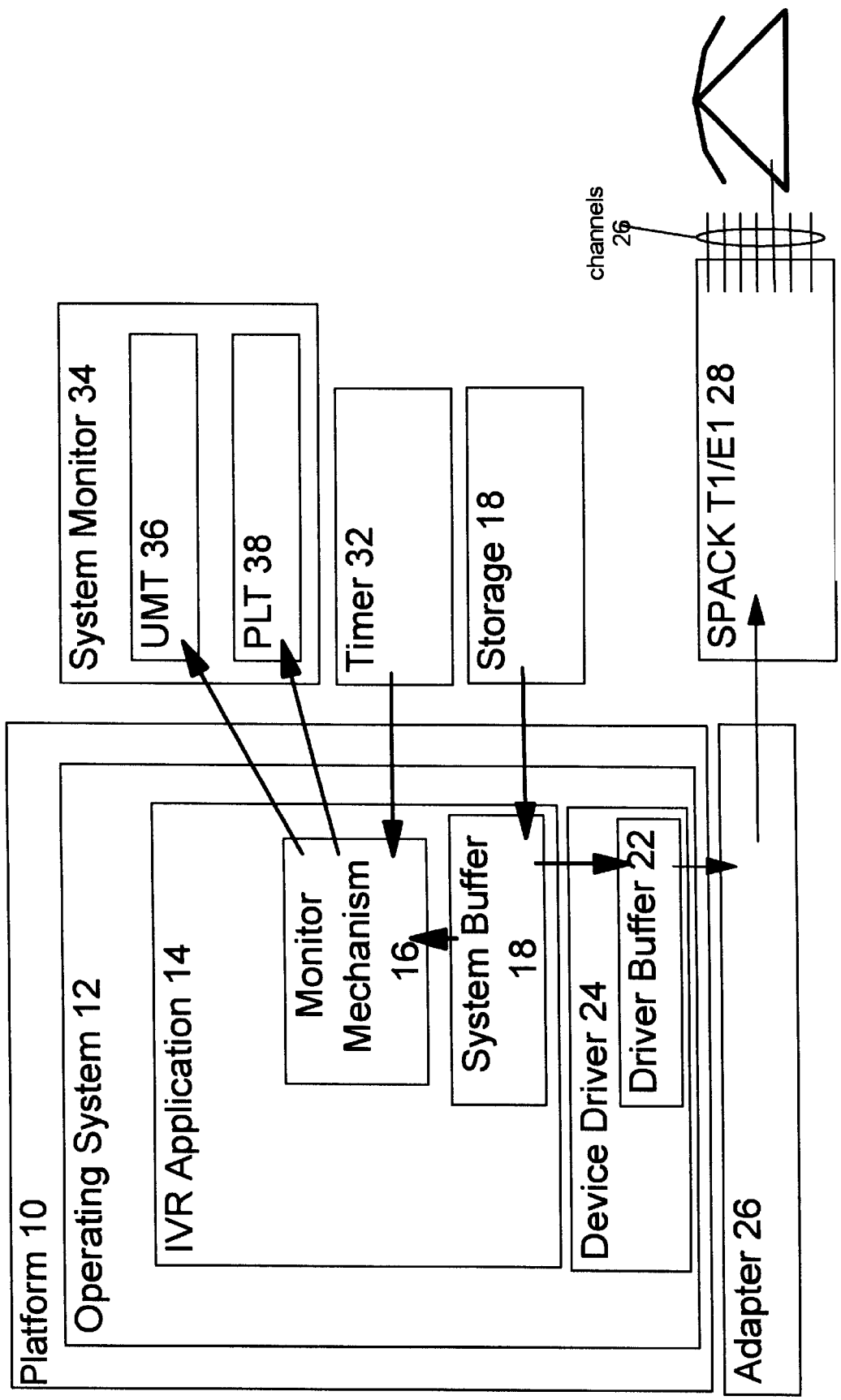
FIG. 2 is a schematic representations of an Interactive Voice Response (IVR) system of the present embodiment.

A computer platform 10 such as IBM RS/6000 loads an operating system 12 such as AIX and an Interactive Voice Response application 14 (IVR) such as DirectTalk for AIX v2.2 on start up. The IVR application 14 performs/telephony processing functions on telephony channels 28 which are typically connected through a telephony switch (PBX) to a telephony network (not shown). The type of processing performed is best given by way of an example. A caller using telephone 30 rings a number associated with the IVR 14, the IVR 14 will assign a telephony channel 16 to the call and connect with the call. Typically the IVR 14 will play a introductory voice segment to a call prompting the caller for some input, either in the form of DTMF key presses or speech. The IVR 14 can analyse the key input or speech and then further process the call, possibly supplying the caller with information or connecting the user to an agent (by requesting a connection through the PBX) who will further deal with the call.

The IVR 14 is capable of retrieving a voice segment for playing to a caller from storage 18, placing the voice segment in system buffer 20 which is part of the voice application or operating system and sending the voice segment to a driver buffer 22 which is part of a device driver 24. A voice segment is typically 1 minute long and comprises blocks of data. The IVR will typically request a 4 second sequence of data blocks to fill the system buffer 22. The device driver is a software component that provides an interface between the operating system and a hardware adapter 26 in order to use the resources provided by those hardware components or by components attached through an adapter. The adapter 26 resides in a computer which provides a connection to a telephony interface 28; the interface 28 resides outside the computer and provides either T1 or E1 telephone channels connecting to a telephony switch or trunk line. The telephony interface 28 can play uncompressed or compressed data but needs to be informed of the the type of voice data it is receiving from the IVR 14.

The IVR 14 contains a monitor mechanism 30 component which takes input from a timer 32, controls the input and output of the storage 18 to the system buffer 20, and can store and display metrics on the system monitor 34. the two metrics of interest to the embodiment are the Underrun Margin Time (UMT) 36 and the Play Latency Time (PLT) 38.

The Underrun Margin Time (UMT) is a representation of how close an IVR channel is from experiencing an "underrun" condition during the playing of a single, contiguous voice segment. An underrun occurs when the IVR telephony device driver data buffers are emptied and the contents have been played to the caller, and more data exists in the stored voice segment, but this data has not yet been supplied to the IVR device driver by the IVR application. This is unacceptable in a real-time IVR application because the caller will experience an audible "gap" between parts of a voice segment. At a gap of around 200 milliseconds, callers will start to notice this situation and perceive it as a "voice quality problem". In a system which is not CPU constrained, and where the IVR device driver is operating within acceptable timing constraints, then exposure to underrun will generally only occur when playing a voice segment which is too large to fit in the IVR device driver internal buffers. A decrease in the UMT value indicates that the IVR system is operating under stress and that callers may start to notice a degradation in performance. If the UMT value reaches zero, then underrun is imminent. A negative UMT indicates that underrun has occurred.

The UMT is calculated as follows:

1. If the voice segment data is larger than the size of the IVR device driver buffer, then a UMT needs to be calculated. This is because there will be a need for the IVR application engine to provide the subsequent data blocks to the device driver. If the entire voice segment fits in the IVR device driver buffer, then there is no subsequent voice data to be read and the exposure to underrun is restricted to the normal IVR device driver timing constraints, as discussed above.

2. Prior to the request to the IVR device driver to initiate a play of the first set of blocks, the Next Underrun Time (NUT) is calculated, as follows: NUT=current_time+ ((number_of_bytes_of_voice_data/blocksize_of_ voice _data) * number_of milliseconds_per_block).

3. Prior to the request to the IVR device driver to send any subsequent blocks, the UMT is calculated, as follows: UMT=NUT—current_time.

The Play Latency Time (PLT) is a representation of the time taken between fetching the first block (or blocks) of voice data on an application request to play a voice segment and delivering it to the IVR telephony device driver in order for it to be played on a telephony channel. An increase in the PLT value indicates a degradation in performance. When the PLT exceeds 200 milliseconds, then the delay will start to become audibly obvious to the caller. The PLT is calculated as the time taken between the I/O request to obtain the first block (or blocks) of voice data, and the device driver initiating a play on the telephony channel.

Figure 3:
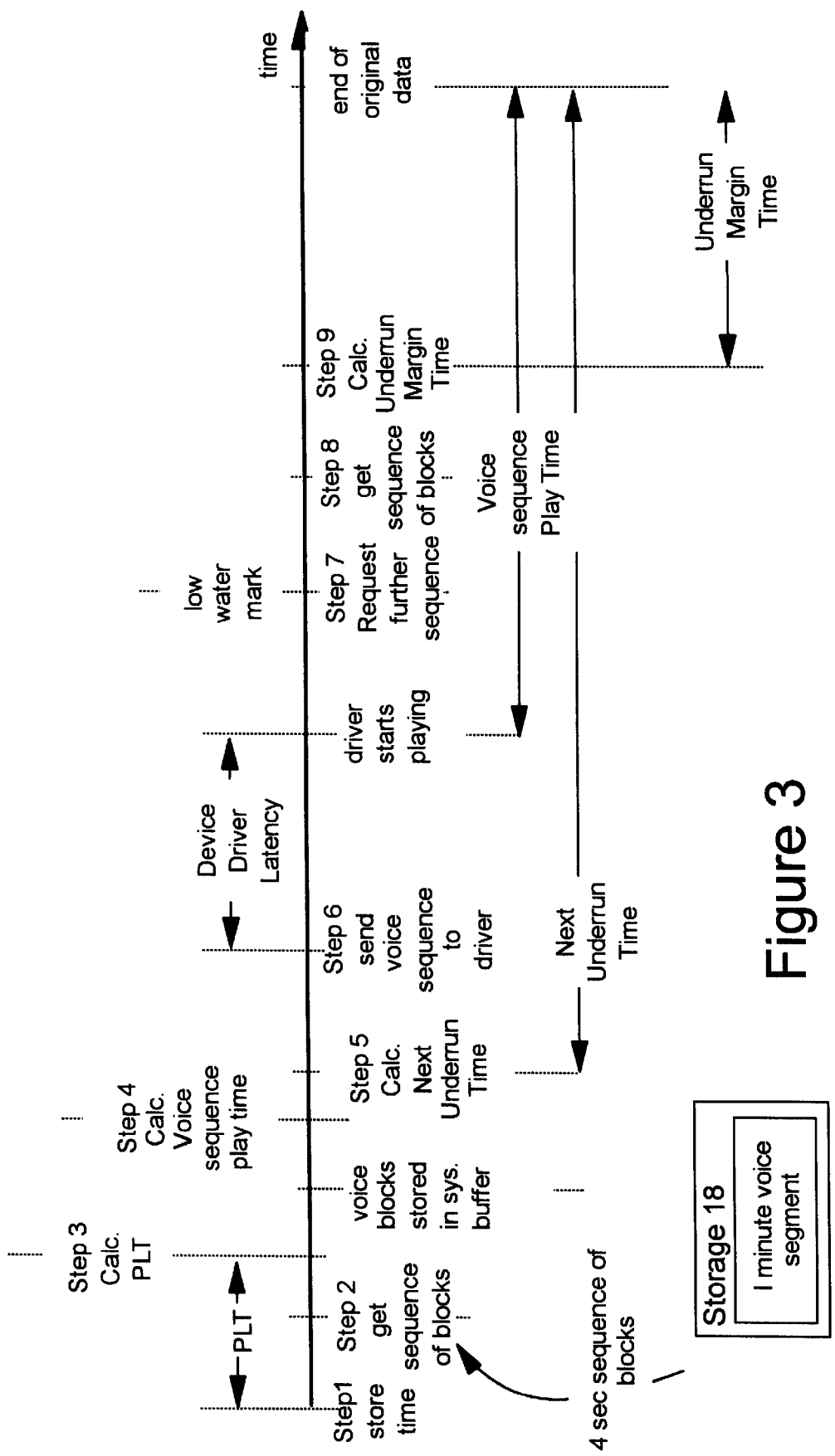
FIG. 3 is a schematic time line of the events and steps in the present embodiment.

Process steps are shown in the timeline of FIG. 3 and summarised below:
1) Store time
2) Get voice sequence
3) Calculate Play Latency (only first time round)

4) Calculate Voice sequence play time
5) Calculate Next Underrun Time (NUT)
6) Send voice sequence to driver
7) Wait for device driver request for a further sequence (triggered by low water mark)
8) Get subsequent voice sequence
9) Calculate Underrun Margin Time (UMT)=NUT−Current Time
10) go back to step 4

The mechanism 30 retrieves the time from timer 32 and stores it for future reference (step 1).

Next a voice sequence of the required voice segment is retrieved from the storage 18 and stored in the system buffer 18 (step 2). The PLT is calculated (step 3) by taking the time at this point (or at any point after storing the voice data in the system buffer 18 and sending the voice data to the driver buffer 22) by subtracting the stored time save (from step 1). This calculation is done only once per voice segment as the value will substantialy similiar over the processing of a voice segment.

The length of time taken to play the voice sequence is calculated (step 4), this is the time it takes from the driver to start playing the voice sequence to when it runs out of the original data and is indicated by a double arrowhead marker labelled 'voice sequence play time'—this value is a relative value. The mechanism can request the length (number of bytes) of the voice sequence transferred to the system buffer 18 by using the relevant I/O procedures, using this length and the knowledge of whether the voice sequence is compressed or uncompressed the voice sequence play time can be calculated. For instance one second of uncompressed voice data is stored in 8000 bytes and one second of compressed voice data is stored in 1600 bytes.

The Next Underrun time is calculated by working out the real time when the original voice data would run out if not replenished (step 5). This is shown is FIG. 3 by the double arrowhead marker 'Next Underrun Time' which is a real time absolute value.

The system buffer is cleared of the voice sequence by sending the sequence to the driver buffer for output to the telephony interface 28 (step 6). The device driver buffer 22 comprises a 'low water' mark within its memory, when the data within the device driver buffer falls below this mark, a request (step 7) for further data is sent out and the IVR will attempt to send a further sequence of voice blocks to the device driver (step 8).

The mechanism 16 attempts to calculate (step 9) the Underrun Margin Time (UMT) by taking the real time at this point and subtracting it from the NUT (calculated in step 5).

The process repeats (step 10) while the voice segment still has data blocks that have not been output by the telephony interface 28 and will jump back to step 4 until the voice segment has been entirely played, or interrupted by the caller by pressing a DTMF key, for example.

The IVR system or application process will make requests to read IVR objects stored in the IVR database in order to run the IVR application. These requests will typically cause the IVR application process to block when this data is being read. Like the Play Latency Time, described above, these blockages, if excessive can also cause a poor perception of the quality of the IVR and/or voice application. Metrics for key requests are also included, for example: 1. When retrieving a telephony profile determining which IVR application to invoke or which voice mail subscriber is the physical caller; and 2. In a voice mail application, the time to retrieve the list of voice messages, which are used in a spoken presentation to the caller who owns the messages in the mailbox.

Each metric is maintained for each IVR application process (or telephony channel) as minimum, maximum and rolling average values. An average of these values for all IVR application processes is maintained. These statistics can be displayed by the IVR Administrator for analysis and are stored in an SNMP MIB (Management Information Block) for use in network monitoring tools, such as Tivoli or Netview. Each metric has an associated configurable alert threshold value. When the global PLT average exceeds (or the UMT average is less than) the configured threshold, then the IVR system generates an alert to warn the Administrator. Similarly, alerts can be generated if an individual IVR application process experiences an out-of-threshold condition, using a separately configurable threshold value.

The design described above describes the metrics being calculated in the IVR application engine, which is often located in a software layer immediately above the IVR device driver. A complimentary implementation might be done in the IVR device driver or hardware itself, although this may be confined to measuring the UMT only, since overall latencies are probably affected by the software layers above the device driver. One advantage of doing this would be that the effects on the device driver itself could be monitored. However, performance sensitive, and blocking, application requests could not be measured if an implementation was confined to the device driver alone. An ideal implementation would combine both approaches.

The described characteristics of IVR responsiveness can be easily measured within the IVR system, both in testing and in production. Without this capability, one is reliant on subjective views of responsiveness. Alternative approaches might deploy external hardware/software monitor tools, which need to be programmed and increase cost.

The monitor subsystem can, optionally, be used to shut down telephony channels when the metric exceeds a defined threshold, to attempt to reduce the application load, and to bring overall performance back to within acceptable limits. The number of channels used by the IVR is programmable, the IVR can control the telephony interface 28 to reduce or increase the number of channels. If the IVR processor has a particularly high work load then the UMT will decrease from a positive value towards zero; at a defined threshold the IVR may lower the number of channels it processes.

The computer platform 10, operating system 12 and IVR 14 application are examples used in the embodiment and are not essential, any computer platform 10 and operating system 12 capable of running an IVR 14 could provide an environment for performing the invention. Furthermore the IVR is an example and any IVR which outputs voice segments on a telephony channel would be an appropriate environment for the invention.

What is claimed is:

1. A method of controlling system performance in an interactive voice response system, said voice response system including a voice device driver, a voice segment stored in a file, a buffer for storing the voice segment prior to sending to the voice device driver, and a plurality of voice channels for output of the voice segment, said method comprising the steps of:

requesting a sequence of voice blocks be sent to a buffer, said sequence being one of a plurality of sequences making up a voice segment;

determining the number of voice blocks sent from the file to the buffer;

requesting the device driver to initiate play of the sequence;

calculating the play period of the sequence;

calculating a next underrun time when the sequence will finish playing based on the time the initiate play is requested and the play period;

calculating a margin period between the calculated next underrun time and the actual time after a further sequence of voice data blocks is sent to the buffer in response to a device driver request for said further sequence of voice data blocks; and shutting down a telephony channel when the margin period exceeds a defined threshold, to attempt a reduction in the application load, and to bring the margin period back to within acceptable limits.

2. The method as claimed in claim 1 further comprising the steps of calculating the time taken to fetch the sequence of voice blocks.

3. The method as claimed in claim 2 further comprising the steps of: before requesting the voice blocks to be sent to the buffer, storing the current time; and after the voice blocks have been sent to the buffer and before requesting the device driver to play the voice sequence subtracting the new current time from the stored current time.

4. The method as claimed in claim 3 wherein the buffer is the operating system buffer.

5. The method as claimed in claim 4 wherein the number of voice blocks sent to the buffer is included in the voice block header which accompanies the voice block data.

6. The method as claimed in claim 5 wherein the voice block data is sent to the buffer using operating system I/O routines.

7. The method as claimed in claim 6 wherein the play time of the sequence is calculated by multiplying the number of data blocks sent to the buffer by a constant, the play time of a compressed data block or an uncompressed data block.

8. A performance controller system in an interactive voice response system comprising:

means for requesting a sequence of voice blocks be sent to a buffer, said sequence being one of a plurality of sequences making up a voice segment;

means for determining the number of voice blocks sent from the file to the buffer;

means for calculating the play period of the sequence;

means for requesting the device driver to initiate play of the sequence;

means for calculating a next underrun time when the sequence will finish playing based on the initiate play request and the play period;

means for calculating the margin period between the next underrun time and the actual time after a further sequence of voice data blocks is sent to the buffer in response to a device driver request for said further sequence of voice data blocks; and means for shutting down a telephony channel when the margin period exceeds a defined threshold, to attempt a reduction in the application load, and to bring the margin period back to within acceptable limits.

9. The system as claimed in claim 8 further comprising means for calculating the time taken to fetch the sequence of voice blocks.

10. The system as claimed in claim 9 further comprising:

means for, before requesting the voice blocks to be sent to the buffer, storing the current time; and means for, after the voice blocks have been sent to the buffer and before requesting the device driver to play the voice sequence, subtracting the new current time from the stored current time.

11. The system as claimed in claim 10 wherein the buffer is the system buffer.

12. The system as claimed in claim 11 wherein the number of voice blocks sent to the buffer is included in the voice block header which accompanies the voice block data.

13. The system as claimed in claim 12 wherein the voice block data is sent to the buffer using operating system I/O routines and the voice segment is stored as a file in a directory in a standard operating system format.

14. The system as claimed in claim 13 wherein the play time of the sequence is calculated by multiplying the number of data blocks sent to the buffer by a constant, the play time of a compressed data block or an uncompressed data block.

15. A computer program product comprising computer program code stored on a computer readable storage medium for, when executed on a computer, controlling system performance in an interactive voice response system said voice response system including a voice driver, a voice segment stored in a file, a buffer for storing the voice segment prior to processing by the voice device driver, a plurality of voice channels for output of the voice segment by the device driver said method comprising the steps of:

requesting a sequence of voice blocks be sent to a buffer, said sequence being one of a plurality of sequences making up a voice segment;

determining the number of voice blocks sent from the file to the buffer;

calculating the play period of the sequence;

requesting the device driver to initiate play of the sequence;

calculating the next underrun time when the sequence will finish playing if based on the request to initiate play and the play period;

calculating the margin period between the next underrun time and the actual time after a further sequence of voice data blocks is sent to the buffer in response to a device driver request for said further sequence of voice data blocks; and shutting down a voice channel when the margin period exceeds a defined threshold, to attempt a reduction in the application load, and to bring the margin period back to within acceptable limits.

* * * * *